(12) United States Patent
Kikuchi et al.

(10) Patent No.: US 10,956,470 B2
(45) Date of Patent: Mar. 23, 2021

(54) FACET-BASED QUERY REFINEMENT BASED ON MULTIPLE QUERY INTERPRETATIONS

(71) Applicant: INTERNATIONAL BUSINESS MACHINES CORPORATION, Armonk, NY (US)

(72) Inventors: Hiroaki Kikuchi, Yokohama (JP); Yutaka Moriya, Higashi-Gotanda (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 338 days.

(21) Appl. No.: 16/018,586

(22) Filed: Jun. 26, 2018

(65) Prior Publication Data

US 2019/0392077 A1    Dec. 26, 2019

(51) Int. Cl.
*G06F 17/30* (2006.01)
*G06F 16/33* (2019.01)
*G06F 16/93* (2019.01)
*G06F 16/332* (2019.01)

(52) U.S. Cl.
CPC ...... *G06F 16/3344* (2019.01); *G06F 16/3323* (2019.01); *G06F 16/3328* (2019.01); *G06F 16/3334* (2019.01); *G06F 16/93* (2019.01)

(58) Field of Classification Search
CPC ............. G06F 16/3344; G06F 16/3328; G06F 16/3323; G06F 16/3334; G06F 16/93
See application file for complete search history.

(56) References Cited

U.S. PATENT DOCUMENTS

| | | | |
|---|---|---|---|
| 6,519,586 B2 | 2/2003 | Anick | |
| 9,360,982 B2 | 6/2016 | Emanuel | |
| 9,390,194 B2 | 7/2016 | Cao | |
| 9,715,493 B2 | 7/2017 | Papadopoullos | |
| 9,996,527 B1* | 6/2018 | Ishikawa | G06F 16/338 |

(Continued)

OTHER PUBLICATIONS

International Search Report and Written Opinion for PCT-IB2019-055328 dated Oct. 12, 2019, 9 pgs.
(Continued)

*Primary Examiner* — Huawen A Peng
(74) *Attorney, Agent, or Firm* — William Hartwell; Matthew M. Hulihan; Heslin Rothenberg Farley & Mesiti PC

(57) ABSTRACT

Facet-based query refinement based on multiple query interpretations is provider through a process that includes receiving a query for querying documents, of a whole document set, that deviate by one or more facet values. The process generates different query interpretations from query text of the query. The process executes the different query interpretations to obtain resulting document sets. For each different query interpretation, the executing executes the query interpretation to obtain a resulting document set corresponding to that query interpretation, and identifies facet values represented in the resulting document set. The process builds and presents to a user a query refinement interface, presenting the different query interpretations and properties of the resulting document sets, as well as, for each of the one or more facet values, and relative to each other, facet value representation of the facet value in each of the resulting document sets.

20 Claims, 11 Drawing Sheets

(56) References Cited

U.S. PATENT DOCUMENTS

| | | | |
|---|---|---|---|
| 10,180,984 B2* | 1/2019 | Emanuel | G06F 16/93 |
| 10,459,981 B2* | 10/2019 | Lewin-Eytan | G06F 16/90324 |
| 2004/0044661 A1 | 3/2004 | Allen et al. | |
| 2004/0117366 A1 | 6/2004 | Ferrari et al. | |
| 2006/0230033 A1 | 10/2006 | Halevy et al. | |
| 2008/0154853 A1 | 6/2008 | Deshpande et al. | |
| 2009/0019028 A1 | 1/2009 | Norris et al. | |
| 2010/0077001 A1* | 3/2010 | Vogel | G06F 16/353 707/777 |
| 2012/0254162 A1* | 10/2012 | Asadullah | G06F 16/3331 707/723 |
| 2012/0265779 A1 | 10/2012 | Hsu et al. | |
| 2012/0278321 A1* | 11/2012 | Traub | G06F 16/3331 707/736 |
| 2014/0258277 A1* | 9/2014 | Cheng | G06F 16/245 707/723 |
| 2015/0012529 A1 | 1/2015 | Emanuel | |
| 2015/0254230 A1* | 9/2015 | Papadopoullos | G06F 16/31 704/8 |
| 2017/0061015 A1* | 3/2017 | Gungor | G06F 16/2425 |
| 2018/0322221 A1* | 11/2018 | Ambale | G06F 16/9038 |
| 2019/0114325 A1* | 4/2019 | Zaki | G06F 16/9535 |

OTHER PUBLICATIONS

Z. Dou, et al., "Automatically Mining Facets for Queries From Their Search Results", pub. Sep. 2, 2015, IEEE Transactions on Knowledge and Data Engineering (vol. 28, Issue: 2, Feb. 1, 2016), 6 pgs.

Z. Jiang, et al., "Generating Query Facets Using Knowledge Bases", pub. Nov. 1, 2016, IEEE Transactions on Knowledge and Data Engineering (vol. 29, Issue: 2, Feb. 1, 2017), 14 pgs.

Mell, P., et al., "The NIST Definition of Cloud Computing", NIST Special Publication 800-145, Sep. 2011, Gaithersburg, MD, 7 pgs.

Brown, M., "Data mining in a document world", IBM developerWorks, Feb. 12, 2013, 13 pgs.

\* cited by examiner

FACET-BASED QUERY REFINEMENT BASED ON MULTIPLE QUERY INTERPRETATIONS

BACKGROUND

The present invention relates generally to the field of document queries, and more particularly to facet-based query refinement. Facet-based text mining is one solution for text-mining large volumes of unstructured data. A "facet" is an informational entity associated with informational elements, sometimes referred to as "documents". Facets and facet values may be generated as the result of the natural language processing (NLP) pipeline, in which annotator software detects conditions and adds facets. With respect to the documents, the NLP processes the documents, looking into them for these facet values or features. For instance, facets might be categories for categorizing products in the e-commerce space. Natural language processing might assign categories, of varying granularity, to documents, for instance identifying specific words or phrases included in the documents, creation date(s) or timeframes for the document or items them represent, or categories directed to the sentiment, tone, or expression of the documents or items they represent, as examples. Facets may be aggregated (e.g. when searching) to understand corpus characteristics. Aggregating facets refers to adding conditions, for instance query constraints when searching a document set. A system or user can specify a document set, perhaps via a query, then among that document set, software can sort, rank, and perform other processing on the categories. In some examples, formulas are applied to determine importance of each category.

SUMMARY

Shortcomings of the prior art are overcome and additional advantages are provided through the provision of a computer-implemented method. The method receives a query for querying documents of a whole document set. The documents of the whole document set deviate by one or more facet values. The method generates a plurality of different query interpretations from query text of the query. The method executes the plurality of different query interpretations to obtain resulting document sets. For each different query interpretation of the plurality of different executable query interpretations, the executing executes the query interpretation to obtain a resulting document set, from the whole document set, corresponding to that query interpretation, and identifies facet values represented in the resulting document set. The method also builds and presents, to a user, a query refinement interface. The query refinement interface presents the plurality of different query interpretations and properties of the resulting document sets. Additionally, it presents, for each of the one or more facet values, and relative to each other, facet value representation of the facet value in each of the resulting document sets.

Further, a computer system is provided that includes a memory and a processor in communication with the memory, wherein the computer system is configured to perform a method. The method receives a query for querying documents of a whole document set. The documents of the whole document set deviate by one or more facet values. The method generates a plurality of different query interpretations from query text of the query. The method executes the plurality of different query interpretations to obtain resulting document sets. For each different query interpretation of the plurality of different executable query interpretations, the executing executes the query interpretation to obtain a resulting document set, from the whole document set, corresponding to that query interpretation, and identifies facet values represented in the resulting document set. The method also builds and presents, to a user, a query refinement interface. The query refinement interface presents the plurality of different query interpretations and properties of the resulting document sets. Additionally, it presents, for each of the one or more facet values, and relative to each other, facet value representation of the facet value in each of the resulting document sets.

Yet further, a computer program product including a computer readable storage medium readable by a processing circuit and storing instructions for execution by the processing circuit is provided for performing a method. The method receives a query for querying documents of a whole document set. The documents of the whole document set deviate by one or more facet values. The method generates a plurality of different query interpretations from query text of the query. The method executes the plurality of different query interpretations to obtain resulting document sets. For each different query interpretation of the plurality of different executable query interpretations, the executing executes the query interpretation to obtain a resulting document set, from the whole document set, corresponding to that query interpretation, and identifies facet values represented in the resulting document set. The method also builds and presents, to a user, a query refinement interface. The query refinement interface presents the plurality of different query interpretations and properties of the resulting document sets. Additionally, it presents, for each of the one or more facet values, and relative to each other, facet value representation of the facet value in each of the resulting document sets.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein is facet-based query refinement based on multiple query interpretations. Different query interpretations are generated from an initial query. The different query interpretations are executed, information about the facets/facet values is ascertained, and refinements are applied to aid in facet-based navigation.

As noted, a facet is an informational entity associated with or included in a document (informational element) and that projects or represents characteristic(s) of the document. Documents are classified across multiple facets according to a classification system enabling faceted searching, navigation, and browsing. The term "documents" is used to refer to informational entities, or units of mining, however it is understood that each 'document' can be produced from any type of data. The word 'document' is not to be construed strictly as, for example, a digital document of word processing software (though such files could be an example of a "document" as used herein). Documents, in the informational element sense, could refer to images, for example. In the e-commerce and products space, one database record could be a "document" as used herein. Document databases have an (almost) infinitely flexible structure that provides a number of different key areas of functionality, for instance, they may be schema-less—document databases do not have to predefine the structure of the data that must be stored into the database. Document databases can store any information. A widely used structural format is JSON, an object notation format from the JavaScript language, allowing one to store strings, numbers, arrays, and record (hash) data, and combinations of those core types.

A value for a facet might be stored in metadata of or associated with the document. Example such metadata might be simple characteristics of a document, such as a location (state, province), nouns, adjectives or keywords associated with the document, or more complex characteristics, for instance positive or negative impression(s) conveyed by the document. A procedure of facet-based text mining is to repeat facet aggregation, browse facets, and refine the initial "document set", which is a collection of documents that represent specified facet values, into a refined document set. Facet aggregation can refer to grouping into a document set all of the resulting documents that fit a query, counting the facet values associated with the document set and computing frequency, correlation, co-occurrence and/or a timeline analysis (as examples) for the document set. In document set refinement, consideration of the facet aggregation leads to an extraction of a refined document set based on, for instance, adding an additional keyword or facet condition as a constraint, or selecting a query interpretation as described herein. As the result of repeated aggregation and refinement, knowledge is acquired and new findings are discovered.

Figure 1:
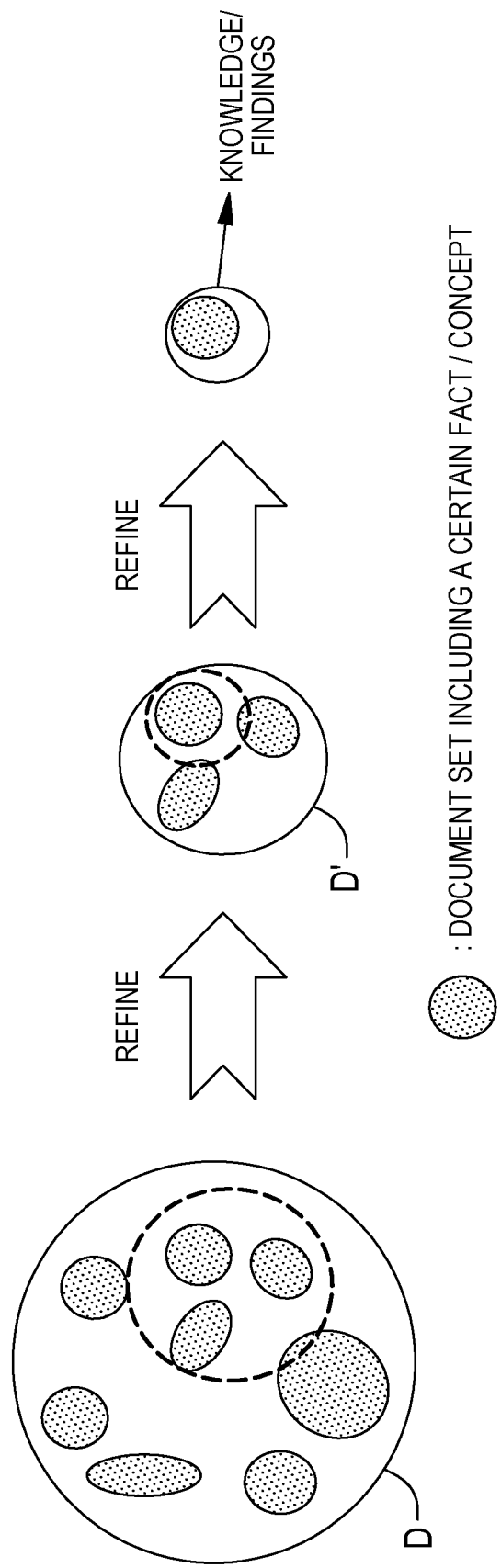
FIG. 1 depicts an example of facet-based text mining.

FIG. 1 depicts an example of facet-based text mining. In FIG. 1, each stippled circle represents a document set (set of documents) that include a specific fact or concept—that is to say, in which a particular facet value is represented. The universe of documents is represented as the set D (a "whole" document set), including the noted document sets represented by the stippled circles. Though the documents sets within D are shown as being mutually exclusive in FIG. 1, practically speaking there may be some overlap among at least some document sets in D, for instance a document representing a product of size 'medium' and 'color' green will appear in the documents set for products of size 'medium' and document set for products of color 'green'.

The figures show two refinements. The first is the refinement of document set D into document set D' based on some constraints or conditions that isolate the three document sets from document set D to form document set D'. The second refinement refines D' into a single document set representing, in this example, the knowledge or findings results.

By way of specific example, assume D is a universe of vehicle incident records and a first query is for those incidents involving green-colored vehicles. The 'vehicle color' is a facet and 'green' is a facet value of that facet, on which the initial document set is searched. This results in a refinement to the three document sets of D'. Assume that of all incidents involving a green vehicle, an age-based facet distinguishes among those incidents (represented as the three disjoint document sets of D')—incidents involving drivers under 20 years of age, incidents involving drivers between 20 and 70 years of age, and incidents involving drivers over 70 years of age. A second refinement—say a query against D' for those incidents involving drivers under 20 years of age—refines D' into the single document set representing the resulting knowledge—incidents involving green vehicles and drivers under the age of 20.

In accordance with aspects described herein, a process accepts a query string to query documents of a whole document set, where the documents of the whole document set deviate by one or more facet values. The process interprets the query in different ways, producing different query interpretations from that query text of the query, and executes those query interpretations to obtain resulting document sets. A 'resulting document set' is the set of documents returned as results from executing one of the query interpretations. Thus, for each different query interpretation, the executing executes the query interpretation to obtain a resulting document set, from the whole document set (i.e. as a subset of the whole), corresponding to that query interpretation. The process identifies facet values represented in the resulting document set. For example, for each interpretation, the resulting document set is determined and the facet values represented in the documents of that resulting document set are identified. The process can display an interface to a user, for instance that arranges or orders represented facet values according to a ranking method applied to the facet values extracted from the resulting document sets of the different query interpretations.

Thus, the ranking can rank the facet values relative to each other according to at least one facet value ranking method, and the interface presents representations of any given facet value in each of the resulting document sets relative to each of the other facet values in ranked order of those facet values. In executing the query interpretations, for each resulting document set, a number of documents in the resulting document set may be counted and, for each facet value, a number of documents both in that resulting document set and in which the facet value is represented may be determined. Following are some example ranking methods.

One example ranking method is interpretation prioritization, for example based on a number of search result documents. As described herein, a query may be interpreted in different ways. The corresponding different resulting document sets may be ranked against each other. A first interpretation may deliver 1000 result documents in the resulting document set, a second interpretation may deliver 300 result documents in the resulting document set, and a third interpretation may deliver 12 result documents in the resulting document set. These interpretations may be ranked relative to each other, for instance in order of ascending number of results.

Other example ranking methods consider facet value scores. An example such score is document frequency—the frequency in which a particular facet value appears in resulting document sets. One facet value (for example the word "cognitive") may appear much more frequently than other facet values (for instance the words "quiz" and "game"). This score may be intuitive but may not be useful for a small search result document set. Correlation is another facet value score to use for ranking. Correlation refers to the relative density of a facet value in a search result document set against the whole document set; across facet values, the frequency in which those facet values appear in resulting document sets relative to the whole document set varies. This is described in further detail below with reference to FIG. 2D.

One example of a facet value ranking is based on maximum score for a facet value across the different query interpretations. For a given facet value, each query interpretation will deliver a resulting document set having a number of times the facet value is represented by documents in that resulting document set. This number of times for each of the resulting document sets can be compared to each other and ranked. This is described further below with reference to FIG. 2B.

Presentation of facet rankings may be effect in any desired manner. In one example (for instance seen in FIG. 2B), a cumulative bar chart is used to display facet values, for instance in cases where search result document sets from the different interpretations are inclusively related. Additionally or alternatively, a histogram may be used when each interpretation produces an independent search result document set.

In interpreting a query, a set of query translation rules is used in some examples. Different query interpretations are generated by applying each query translation rule of the set of query translation rules to the query text, the applying including expanding, modifying, and/or transforming the query. An example implementation for rule-based query expansion is now presented.

Assume the natural language query text is "Company Machine Learning Idea". In this example, four query interpretations are produced by gradually tightening conditions based on simply OR-concatenated keywords:

Query Interpretation A: exact phrase: "Company Machine Learning Idea".

Query Interpretation B: partial noun phrases: (Company AND "machine learning" AND idea).

Query Interpretation C: AND-ed keywords: (Company AND idea AND machine AND learning).

Query Interpretation D: OR-ed keywords: (Company OR idea OR machine OR learning).

Query interpretation A might return no results or too few results for useful mining (for instance, no facet values, if applied, would provide further useful refinement between the results). Query B might return an appropriate size of the search result document set and include outstanding facet values such as 'Cognitive', 'Quiz' and 'Game' (and as a following step, the users might drill down into the document set by one or more of those facet values, for instance). Query C might return a large number of search result documents but a flat facet distribution (meaning a relatively same frequency for 'Cognitive', 'Quiz', and 'Game'). Query Interpretation D is the broadest and this example might deliver too large a document set to deliver additional value.

These results may be presented in a query refinement interface for a user to refine the query. For instance, buttons or other interactive interface elements can be presented to the user for selection to select one (or more) of the interpretations by which the initial document set is to be refined. Each of the interpretations may be individually selected to narrow a current document set, representing results to be conveyed to the user, to a refined document set that includes the resulting document set obtained from executing the selected query interpretation.

Similarly, the interface can additionally or alternatively present a respective interactive interface element for individually selecting one or more of the facet values to narrow the current document set to a refined document set that includes the documents in which the selected facet value is represented.

Further details of a query refinement interface are described and depicted with reference to FIG. 4 below. Some elements of such a refinement interface are presented with reference to FIGS. 2A-2B in connection with example rule-based query expansion facet navigation, in accordance with aspects described herein.

Figure 2A:
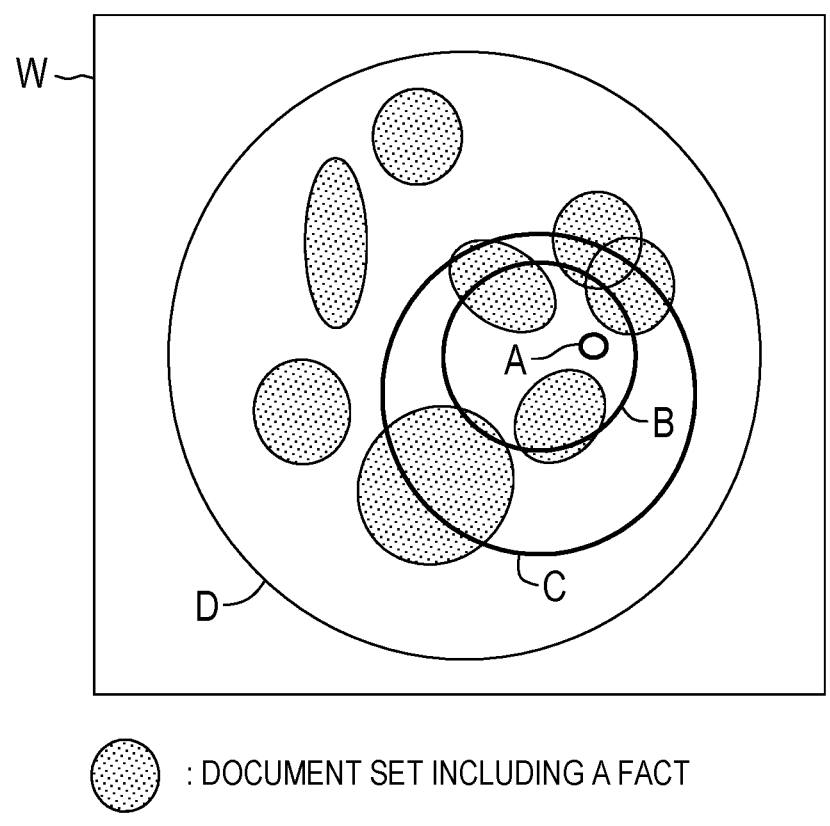
FIGS. 2A-2B depict an example rule-based query expansion facet navigation, in accordance with aspects described herein.

Referring initially to FIG. 2A and using the example query above ("Company Machine Learning Idea"), W represents a whole document set of the database, i.e. the set of all documents in the universe being searched. D represents the resulting document set from executing the query interpretation D above (Company OR idea OR machine OR learning). Several document sets, each including a particular fact/facet, are identified by the stippled circles. C represents the resulting document set from executing the query interpretation C above (Company AND idea AND machine AND learning). Within that resulting document set C, several different facet values are represented in the documents of that set—in this example the document of all/some of 5 different facet values as indicate by the 5 stippled circles at least partially encompassed by set C.

B represents the resulting document set from executing the query interpretation B above (Company AND "machine learning" AND idea). Document set B is a proper subset of document set C since query B is a special case of query C. A represents the resulting document set from executing the query interpretation A above ("Company Machine Learning Idea").

Figure 2B:
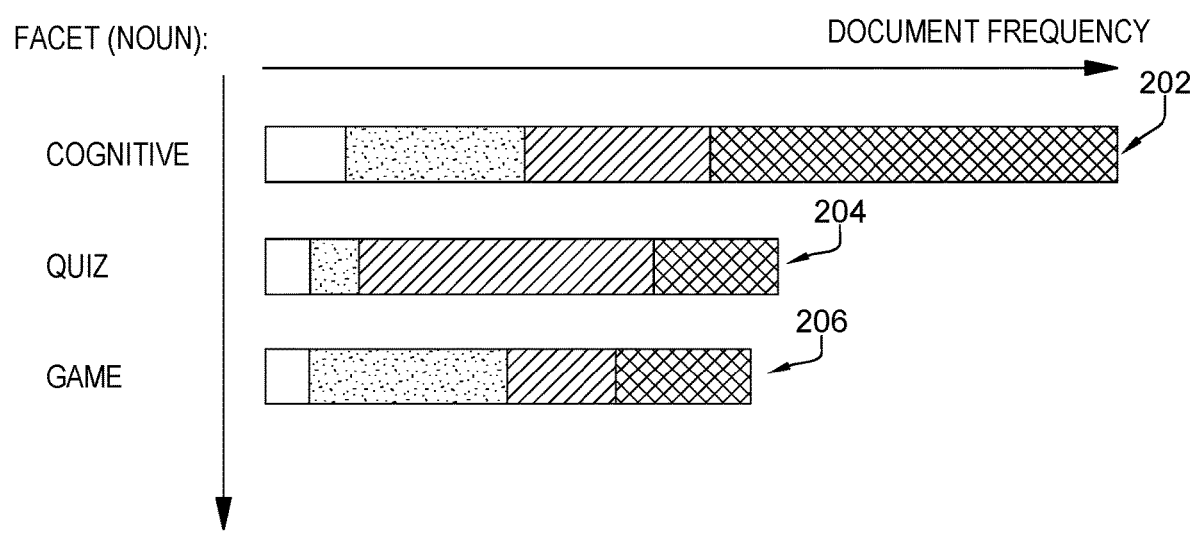

FIG. 2B presents an example cumulative bar chart used to display facet values present in resulting document sets. The y-axis lists, for the facet 'noun', three facet values—"Cognitive", "Quiz", and "Game". The document frequency (x-axis) refers to a number of documents in which that facet value is represented. Each bar 202, 204 and 206 has component segments—clear, stipple, single line hatch, and cross hatch—correlating to the four different query interpretations in the above example, and represents the accumulation of documents from each of the different query interpretations. The cross-hatched portion of each bar represents the frequency with which the corresponding facet value is represented in the resulting document set obtained from executing query D. The single-line (diagonal) hatched portion of each bar represents the frequency with which the corresponding facet value is represented in the resulting document set obtained from executing query C. The stippled portion of each bar represents the frequency with which the corresponding facet value is represented in the resulting document set obtained from executing query B. The clear (white) portion of each bar represents the frequency with which the corresponding facet value is represented in the resulting document set obtained from executing query A.

Thus, for instance, the facet value "cognitive", a keyword, appears in a greater number of documents of the document set delivered from executing query D than the number of documents of the document sets delivered from executing queries C, B and A, as seen from bar 202. The number of documents of the document set delivered from executing queries B and C are roughly equivalent in terms of the frequency of "cognitive" in the document sets obtained from running queries B and C. For the facet value "Quiz", the document frequency from query C (single-line hatched portion) is much greater than the document frequency from queries A, B and D since the single-line hatched portion of bar 204 is significantly larger than the other segments of bar 204. In this particular example, the facet values are sorted (ordered from the top down on the y-axis) by overall of cumulative document frequency, meaning that document frequency for the "Cognitive" facet value—the total number of times "Cognitive" appears in executing queries A through D is greater than the total number of times the facet value "Quiz" appears in executing queries A through D. In this regard, the facet values ("Cognitive", "Quiz", "Game") are ranked relative to each other according to at least one facet value ranking method (e.g. document frequency in this example). The query refinement interface can present the facet value representation (i.e. a measure of the representation of facet value—in this example the frequency in the documents) of each facet value in each of the resulting document sets (i.e. across the interpretations) relative to each other facet value of the facet values in a ranked order of the facet values.

An example implementation for concept-based query modification for facet navigation is now presented. In this approach, starting with simple OR-concatenated queries, different interpretations are generated by intelligently extracting categories or expanding keywords.

Assume the natural language query text is "What is the most outstanding Company invention related to natural language processing?". In this example, three query interpretations are produced:

Query Interpretation A: phrases, words w/category: ("natural language processing" OR "NLP") AND category: AI AND company:Company.

Query Interpretation B: extracted categories: company: Company AND category:AI.

Query Interpretation C: OR-ed essential keywords: outstand* OR Company OR invention OR language OR processing.

As before, results of executing these interpretations can be delivered within a query refinement interface for a user to refine the query. Example interface elements are presented with reference to FIGS. 2C-2D in connection with example concept-based query modification for facet navigation, in accordance with aspects described herein.

Figure 2C:
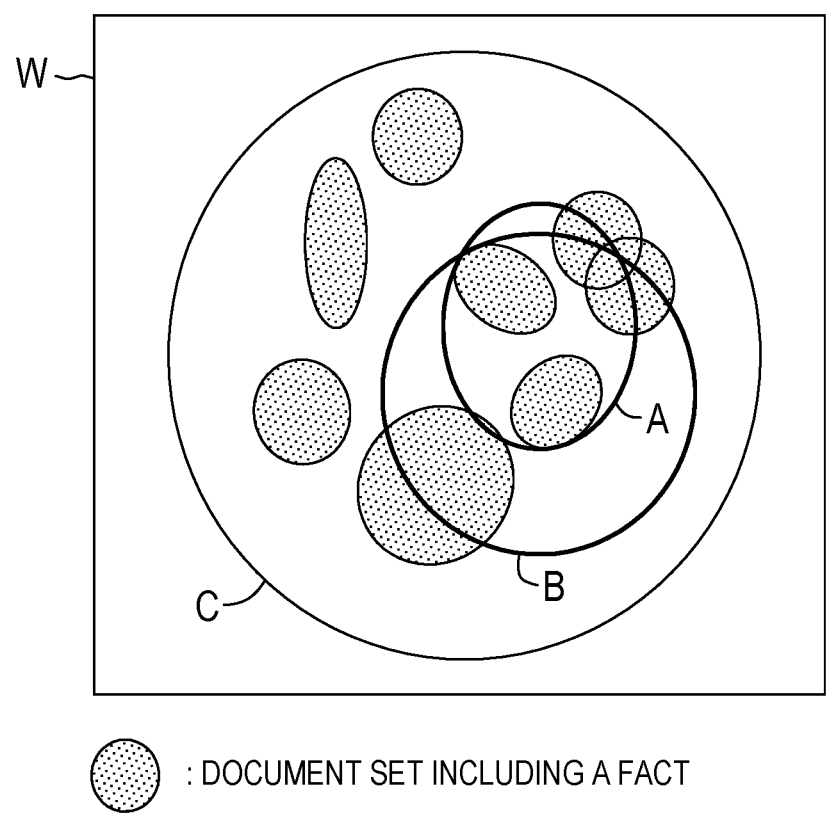
FIGS. 2C-2D depict an example of concept-based query modification for facet navigation, in accordance with aspects described herein.

Referring initially to FIG. 2C, W represents a whole document set of the database, i.e. the set of all documents in the universe being searched. C represents the resulting document set from executing the query interpretation C above (outstand* OR Company OR invention OR language OR processing). B represents the resulting document set from executing the query interpretation B above (company: Company AND category:AI), meaning searching for documents in which the facet value for a company attribute is the name of the company ("Company") and the facet value for a category attribute is artificial intelligence, or AI. A represents the resulting document set from executing the query interpretation A above (company:Company AND category: AI). As before, the stippled circles represent document sets in which a particular facet value is represented.

Figure 2D:
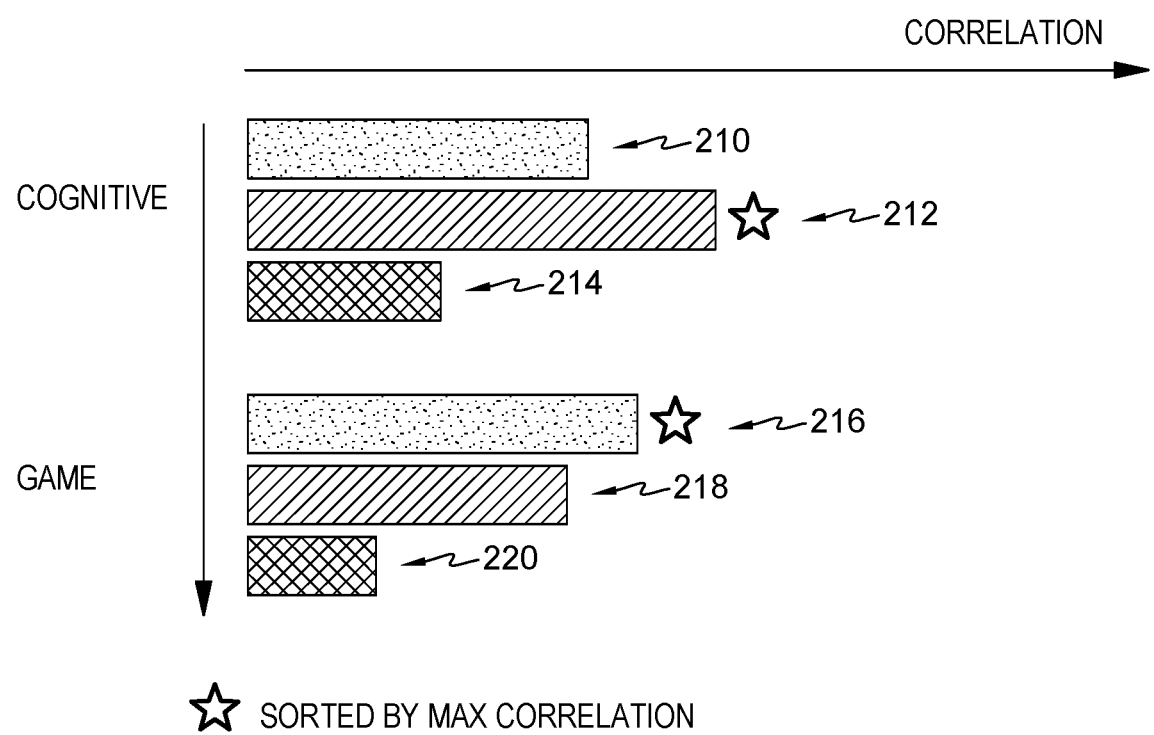

FIG. 2D presents an example bar chart to display facet values and correlation present in resulting document sets. The y-axis lists, for the facet 'noun', two facet values— "Cognitive" and "Game". Each facet value has three associated bars corresponding to the three query interpretations in this example. Cross-hatched bars represent query C, single-line hatched represent query B, and stippled bars represent query A. The facet value "Cognitive" is associated with bars 210, 212, 214 and the facet value "Game" is associated with bars 216, 218 and 220.

The magnitude of each bar is a measure of correlation (x-axis), referring to the relative density of the facet value in the resulting document set relative to the facet value represented in the whole document set. Looking at FIG. 2D, query interpretation B (bar 212) indicates the highest correlation for facet value "cognitive", meaning out of all documents in W that include "cognitive", the document set resulting from executing query interpretation B captures the highest number of those documents in comparison to the document sets resulting from executing query interpretations A or C. Query interpretation A (stippled bar 210) has the second highest correlation score for facet value "cognitive". With regard to the facet value "game", query interpretation A has the highest correlation score, meaning interpretation A results in a document set that includes a greater percentage of documents having "game" as a facet value represented by/in the documents as compared to the document sets resulting from queries B or C. It is seen that the interface presents representations of each such determined correlation score relative to other determined correlation scores.

Some interpretations are not inclusively related, so correlation to the entire corpus may be useful. The word 'Game' may be useful because its correlation is the highest for query A in this example. At the same time, without repeating query execution trial-and-error, the user can notice the combination query B and the word 'Cognitive' is also useful for mining by its correlation value.

In FIG. 2D, the facet values "Cognitive" and "Game" are sorted along the y-axis by maximum correlation. The maximum correlation score seen in facet value "cognitive" (bar 212) is higher than the maximum correlation score seen in facet value "game" (bar 216).

Therefore, as part of the executing, and for each facet value of the facet values and each resulting document set, a correlation score may be determined, the score representing density of the facet value represented in the resulting document set (i.e. appearance of the facet value in the documents of the resulting document set) relative to the facet value represented in the whole document set (i.e. appearance of the facet value in the documents of the whole document set).

Figure 3:
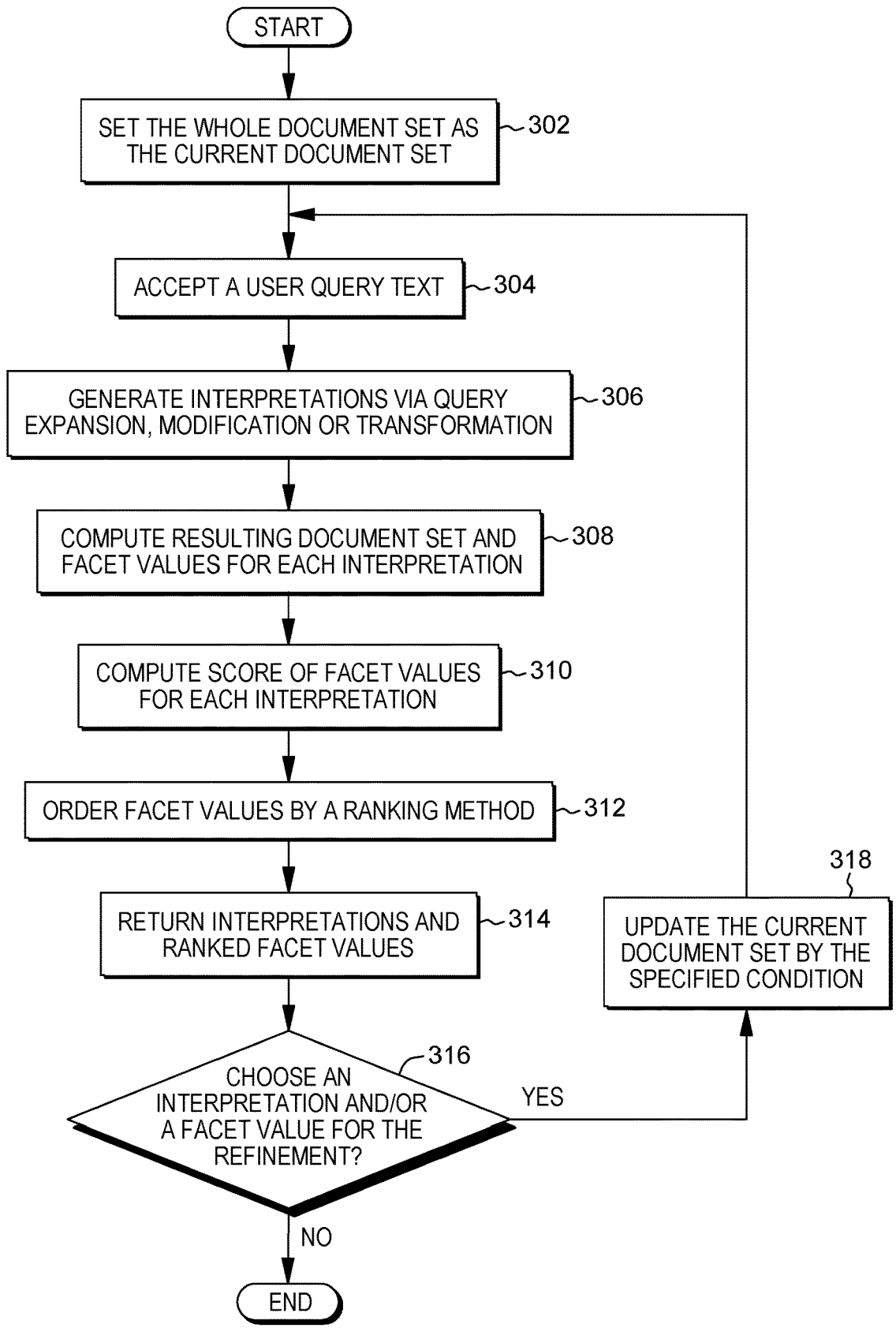
FIG. 3 depicts an example process for facet navigation on multiple query interpretations, in accordance with aspects described herein.

FIG. 3 depicts an example process for facet navigation on multiple query interpretations, in accordance with aspects described herein. The process is performed by one or more computer systems, for instance a database system or component thereof, and/or one or more other computer systems in communication with a database.

The process initially sets a 'current document set' to be the whole document set, or universe of documents against which the initial query will be executed (302). The current document set is what is refined according to aspects described herein for facet-based query refinement. The process accepts user query text (304), which may be text entered by a user or may be text generated based on a user query, for instance a spoken natural language query that is transcribed to text. The process generates interpretations of that initial query via query expansion, modification, and/or transformation (306). This refers to removal, addition, or change to words of the query, a conceptual transformation, for instance by way of a syntax change, category constraint, or introduction or change of a concept represented in the initial query, as examples. In the example above describing query modification via conceptual information, the category 'artificial intelligence' (AI) was injected into interpretations A and B. Another example is a change of the word "computer" to "system". Query interpretations may be generated from query translation rules applied to the query text.

Continuing with FIG. 3, the process computes the resulting document set and facet values (represented in those sets) for each of the query interpretations (308), for instance by executing the queries and assessing the results. The process computes score(s) of the facet values for the resulting documents sets of each of the different interpretations (310). These scores may be useful in presenting the results to the user in a query refinement interface. For instance, the process, in building the interface, orders facet values by a ranking method (312) and returns to the user the interpretations and ranked facet values in the form of the query refinement interface (314). The user may use the interface to choose an interpretation and/or facet value(s) for a refinement, as explained with reference to FIG. 5. The process determines whether the user chooses an interpretation and/or facet value(s) for a refinement. If not, (316, NO) the process ends. Otherwise (316, YES), the user chooses to refine the initial query, for instance by refining the query to one of the generated and executed interpretations and/or by refining to one or more selected facet values. The process in this case updates the current document set by the specified condition (interpretation and/or facet value(s)) (318) and returns to 304. In returning to 304, in one example, the user could type or provide a new or modified query and this is run against the (now-refined) current document set, repeating the interpretation generation, etc. of FIG. 3 for that new/modified query.

Thus, the process may proceed through 304-316 for an initial query, and iterate, for a new query, the generating (306), computing/ordering (308-312), and presenting (314), based on the user selecting (i) a query interpretation, and/or (ii) a facet value that refines the whole document set to a refined document set. When iterating, the refined document set is used as the whole document set in the repeating, the query used in the repeating is a new query, and the generated different query interpretations are different query interpretations of query text of that new query. The new query could include (i) another query input by the user and/or (ii) a modified version of the initial query, the modified version generated based on a selected query interpretation or facet value.

Figure 4:
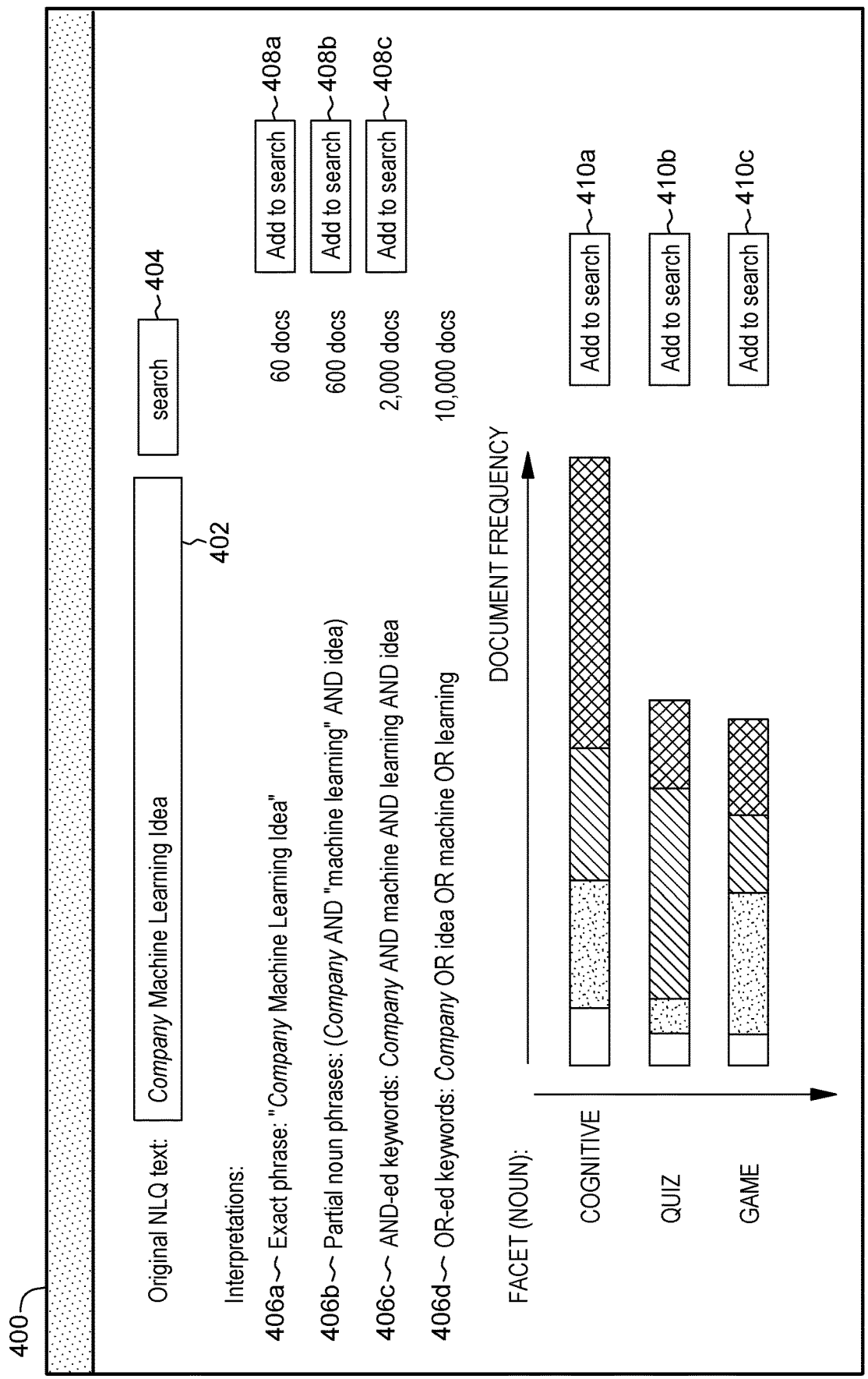
FIG. 4 depicts an example query refinement interface, in accordance with aspects described herein.

FIG. 4 depicts an example query refinement interface, in accordance with aspects described herein. Interface 400 presents an original NLQ text box 402 and corresponding search button 404 for a user to enter a natural language query. In alternatives, the user dictates a query which is transposed into a text-based input query. The user entrance of the query can trigger actions described herein, for instance the processing of FIGS. 3 and/or 6. In this example, the NLQ is "Company Machine Learning Idea" (an example described above).

The generated interpretations 406a (interpretation A), 406b (interpretation B), 406c (interpretation C), 406d (interpretation D) are presented in interface 400. Next to interpretations 406a, 406b, and 406c is an indication of the number of documents in each of the resulting document sets—one document set for each interpretation. The user can use "Add to search" interface elements 408a, 408b, 408c (buttons in this example) to refine the query to interpretation A, B, or C, respectively, in other words to tell the system to use that interpretation in conveying query results to the user. Clicking one of these buttons is an example selection by the user to refine/narrow the current document set (316, YES of FIG. 3), to implement the mining experience. This is akin to a refinement from D to D' as described with reference to FIG. 1.

Interface 400 also presents a cumulative bar chart, which is that of FIG. 2B in this example. Facet values "cognitive", "quiz" and "game" are sorted top-to-bottom in order of decreasing document frequency, with each bar indicating the contribution of each document set to the total number of times that facet value appears across all resulting document sets of the four query interpretations.

Interface 400 presents, for each of these facet values, a respective interactive interface element (buttons 410a, 410b, 410c) for individually selecting each of the facet values, to add it to the search. Selecting the Add to Search button of one of the facet values narrows the current document set to a refined document set including the documents in which a selected facet value is represented.

Interface 400 can be built and presented to the user. The interface can present the different query interpretations and properties of the resulting document sets (for example the number of hits/documents in each resulting document set) for each interpretation.). It additionally presents, for each of the facet values, and relative to each other, facet value representation of the facet value in each of the resulting document sets.

Figure 5:
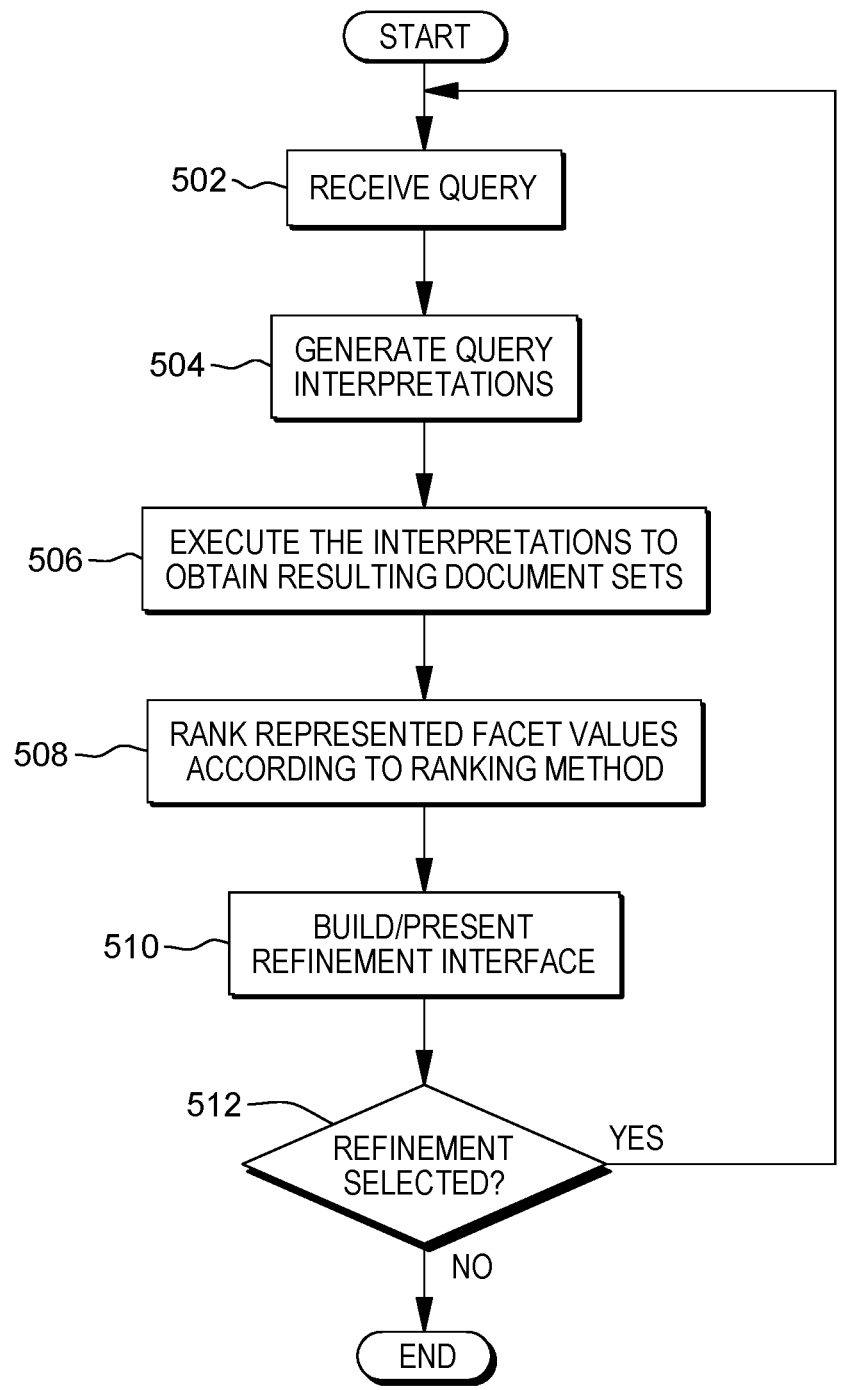
FIG. 5 depicts an example process for facet-based query refinement based on multiple query interpretations, in accordance with aspects described herein.

FIG. 5 depicts an example process for facet-based query refinement based on multiple query interpretations, in accordance with aspects described herein. In some examples, the process is performed by one or more computer systems, such as those described herein, which may include one or more database systems, databases, query handlers, and/or one or more other computer systems.

The process begins by receiving a query for querying documents of a whole document set (502). The documents of the whole document set deviate by one or more facet values, meaning at least some of the documents differ as to what facet values they contain, exhibit, indicate, etc. The query is, as one example, a natural language query submitted by the user. The process generates a plurality of different query interpretations from query text of the query (504). In some examples, the process obtains a set of query translation rules and generates the plurality of different query interpretations by applying each query translation rule of the set of query translation rules to the query text. Applying a query translation rule of the set of query translation rules includes, in this context, expanding, modifying, and/or transforming the query The process continues by executing the plurality of different query interpretations to obtain resulting document sets (506). For each different query interpretation of the plurality of different executable query interpretations, the executing executes the query interpretation to obtain a resulting document set, from the whole document set, corresponding to that query interpretation, and identifies facet values represented in the resulting document set. The executing can count, for each resulting document set of the plurality of resulting document sets, a number of documents in the resulting document set and, for each facet value of the one or more facet values, a number of documents satisfying the conditions that (i) the document appears in the document set, and (ii) the facet value is represented in the document. Additionally or alternatively, the executing can further include determining, for each facet value of the one or more facet values and each resulting document set of the plurality of resulting document sets, a correlation score representing density of the facet value represented in the resulting document set relative to the facet value represented in the whole document set. Representations of the determined correlation scores relative to each other may be presented in a query refinement interface (for instance in aspect 510). Using the results of the executing, the process ranks the one or more facet values relative to each other according to at least one facet value ranking method (508).

The process builds and presents to the user a query refinement interface (510). The query refinement interface presents the plurality of different query interpretations and properties of the resulting document sets, and additionally presents, for each of the one or more facet values, and relative to each other, facet value representation of the facet value in each of the resulting document sets. The query refinement interface can present the facet value representation of the facet value in each of the resulting document sets relative to each other facet value of the one or more facet values in ranked order of the one or more facet values. Example properties of the resulting document sets are a number of documents in each resulting document set of the plurality of resulting document sets.

The query refinement interface can further present a respective interactive interface element, such as a button, for a user to individually select any of the different query interpretations to narrow a current document set, which represents results to be conveyed to the user, to a refined document set that includes the resulting document set corresponding to a selected query interpretation. The query refinement interface can further present a respective interactive interface element for individually selecting each of the one or more facet values to narrow the current document set to a refined document set that includes the documents in which a selected facet value is represented.

The user can select refinement(s) if desired. The process of FIG. 5 determines whether any refinements are selected (512). If not, (512, NO), the process ends. Otherwise (512, YES) the user has selected refinement(s). In these examples, the query is an initial query, and the process returns to 502 to repeat the generating, executing, ranking, and building and presenting, which can be based on the user selecting (i) a query interpretation of the plurality of different query interpretations, and/or (ii) a facet value of the one or more facet values. Such selecting refines the whole document set to a refined document set, where the refined document set is used as the whole document set in the repeating, the query used in the repeating is a new query, and the generated plurality of different query interpretations are different query interpretations of query text of the new query. The new query could include, for instance, (i) another query input by the user or (ii) a modified version of the initial query, the modified version generated based on a selected query interpretation or facet value.

Although various examples are provided, variations are possible without departing from a spirit of the claimed aspects.

Figure 6:
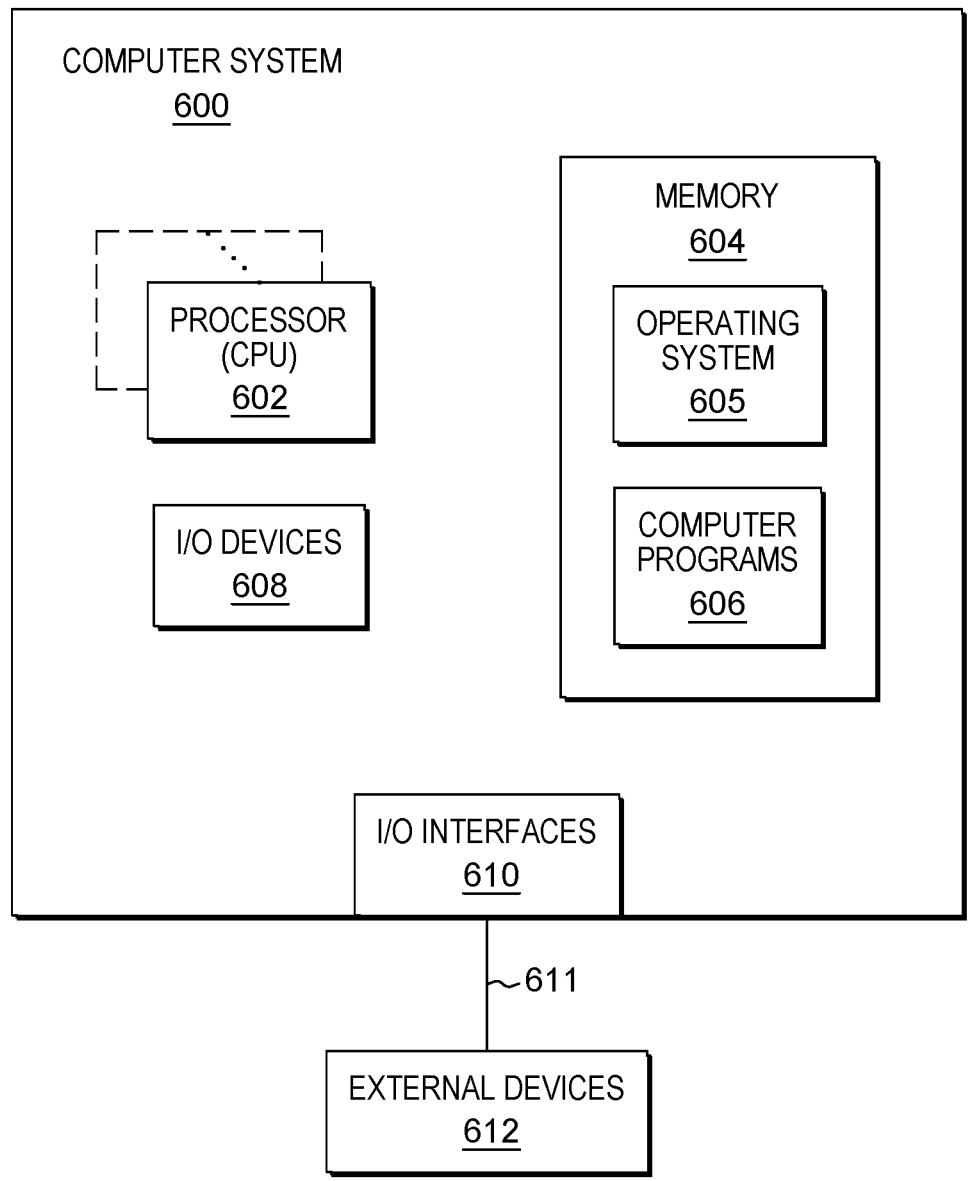
FIG. 6 depicts one example of a computer system and associated devices to incorporate and/or use aspects described herein.

Processes described herein may be performed singly or collectively by one or more computer systems, such as one or more database computer systems and/or computer systems in communication with one or more databases. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be incorporated into and/or use a cloud computing environment. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 7.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
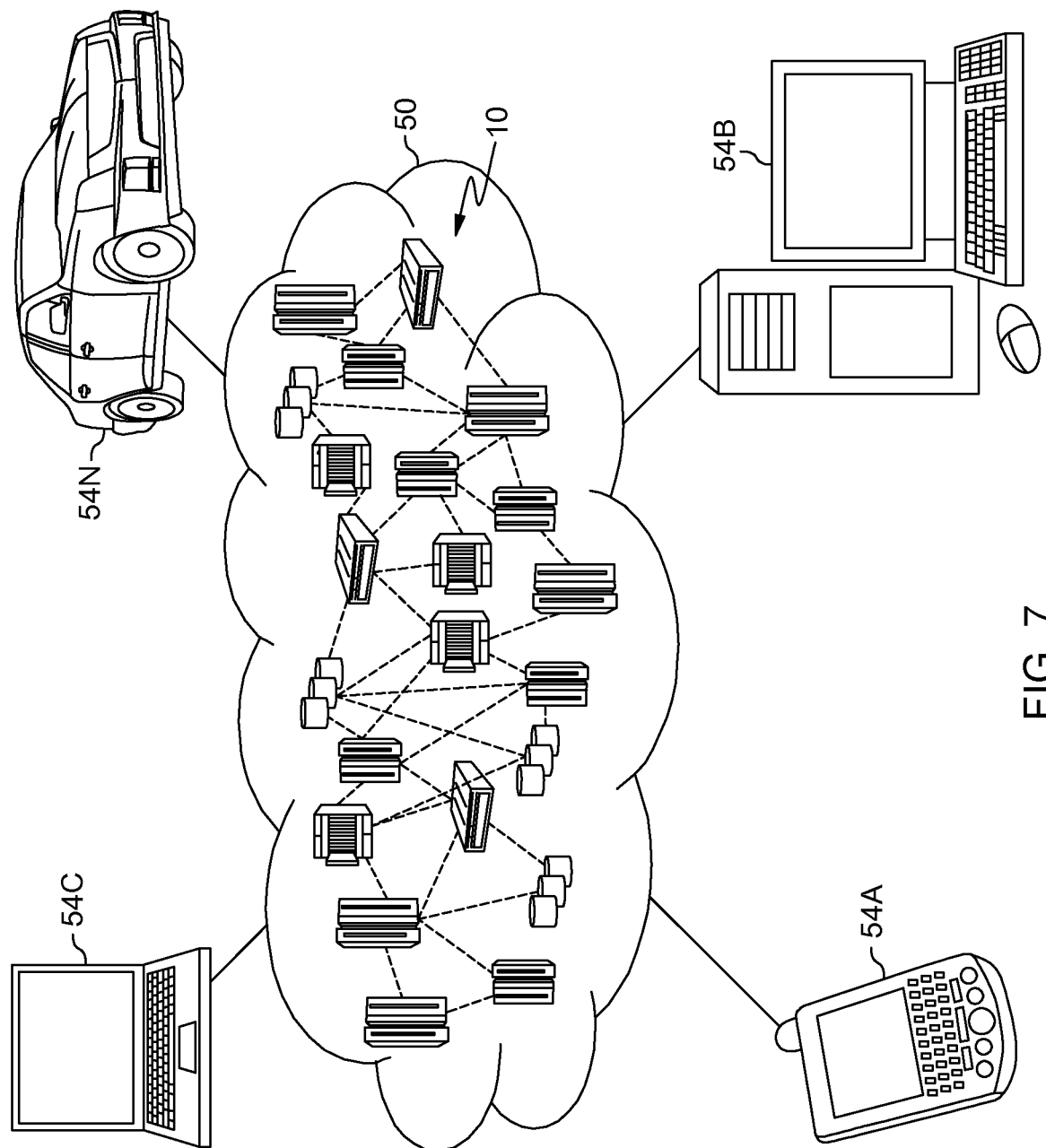
FIG. 7 depicts a cloud computing environment according to an embodiment of the present invention.

Referring now to FIG. 7, illustrative cloud computing environment 50 is depicted. As shown, cloud computing environment 50 comprises one or more computing nodes 10 with which local computing devices used by cloud consumers, such as, for example, smartphone or other mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
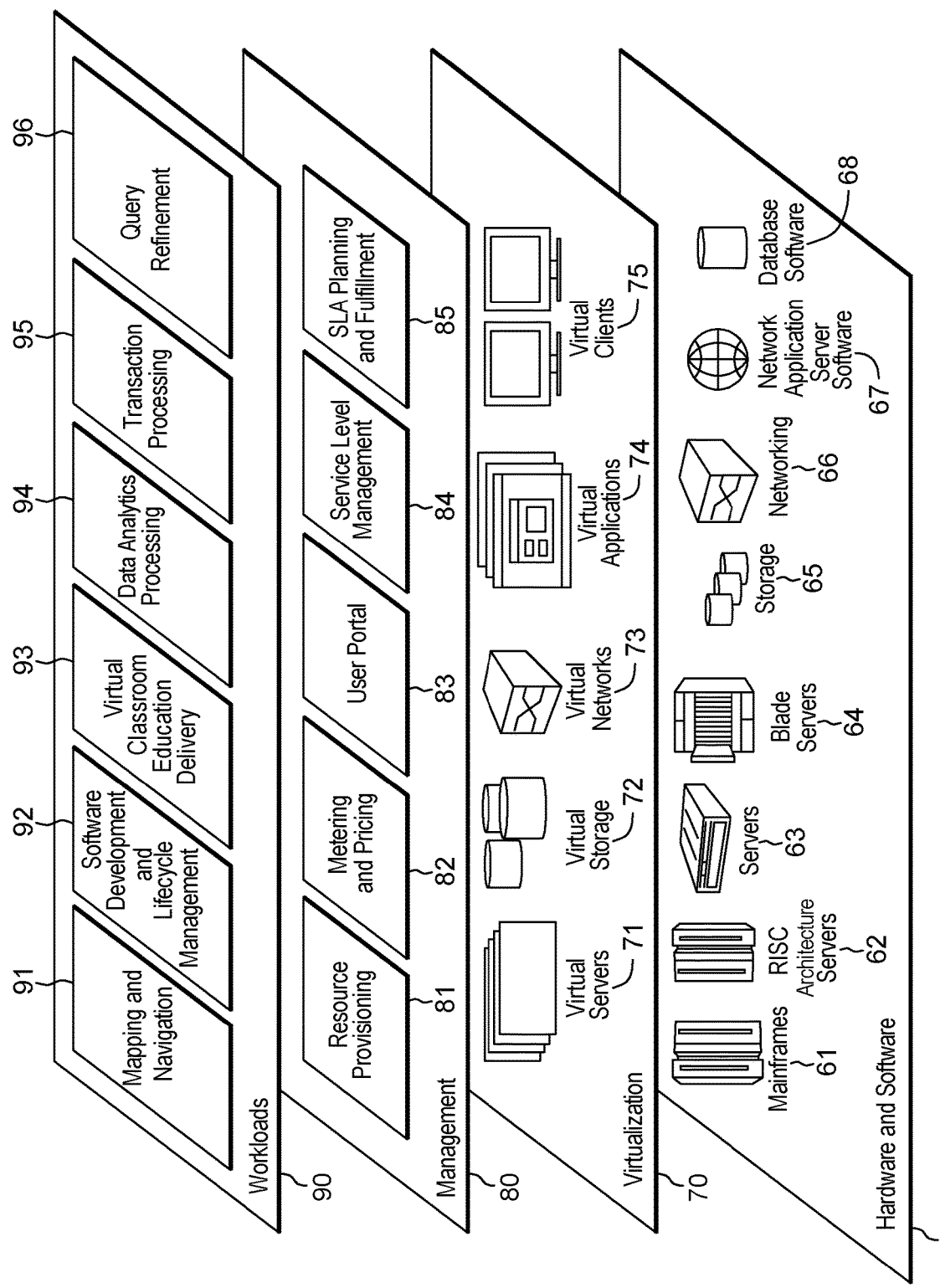
FIG. 8 depicts abstraction model layers according to an embodiment of the present invention.

Referring now to FIG. 8, a set of functional abstraction layers provided by cloud computing environment 50 (FIG. 6) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query refinement 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   receiving a query for querying documents of a whole document set, the documents of the whole document set deviating by one or more facet values;
   generating a plurality of different query interpretations from query text of the query;
   executing the plurality of different query interpretations to obtain resulting document sets, wherein, for each different query interpretation of the plurality of different executable query interpretations, the executing executes the query interpretation to obtain a resulting document set, from the whole document set, corresponding to that query interpretation, and identifies facet values represented in the resulting document set; and
   building and presenting to a user a query refinement interface, the query refinement interface presenting the plurality of different query interpretations and properties of the resulting document sets, and additionally presenting, for each of the one or more facet values, and relative to each other, facet value representation of the facet value in each of the resulting document sets.

2. The method of claim 1, wherein the properties of the resulting document sets comprise a number of documents in each resulting document set of the plurality of resulting document sets.

3. The method of claim 1, wherein the query refinement interface further presents a respective interactive interface element for individually selecting each of the different query interpretations to narrow a current document set, representing results to be conveyed to the user, to a refined document set comprising the resulting document set corresponding to a selected query interpretation.

4. The method of claim 3, wherein the query refinement interface further presents a respective interactive interface element for individually selecting each of the one or more facet values to narrow the current document set to a refined document set comprising the documents in which a selected facet value is represented.

5. The method of claim 1, wherein the query is an initial query, and wherein the method further comprises repeating the generating, executing, and building and presenting based on the user selecting at least one selected from the group consisting of: (i) a query interpretation of the plurality of different query interpretations, and (ii) a facet value of the one or more facet values, to refine the whole document set to a refined document set, wherein the refined document set is used as the whole document set in the repeating, the query used in the repeating is a new query, and the generated plurality of different query interpretations are different query interpretations of query text of the new query.

6. The method of claim 5, wherein the new query comprises at least one selected from the group consisting of: (i) another query input by the user and (ii) a modified version of the initial query, the modified version generated based on a selected query interpretation or facet value.

7. The method of claim 1, further comprising ranking the one or more facet values relative to each other according to at least one facet value ranking method, and wherein the query refinement interface presents the facet value representation of the facet value in each of the resulting document sets relative to each other facet value of the one or more facet values in ranked order of the one or more facet values.

8. The method of claim 1, wherein the query is a natural language query.

9. The method of claim 1, further comprising:
   obtaining a set of query translation rules; and
   generating the plurality of different query interpretations by applying each query translation rule of the set of query translation rules to the query text, wherein applying a query translation rule of the set of query translation rules comprises at least one selected from the group consisting of: expanding, modifying, and transforming the query.

10. The method of claim 1, wherein the executing further comprises counting, for each resulting document set of the plurality of resulting document sets, a number of documents in the resulting document set and, for each facet value of the one or more facet values, a number of documents both in that resulting document set and in which the facet value is represented.

11. The method of claim 1, wherein the executing further comprises determining, for each facet value of the one or more facet values and each resulting document set of the plurality of resulting document sets, a correlation score representing density of the facet value represented in the resulting document set relative to the facet value represented in the whole document set, and wherein the query refinement interface presents representations of each such determined correlation score relative to other determined correlation scores.

12. A computer system comprising:
   a memory; and
   a processor in communication with the memory, wherein the computer system is configured to perform a method comprising:
      receiving a query for querying documents of a whole document set, the documents of the whole document set deviating by one or more facet values;
      generating a plurality of different query interpretations from query text of the query;
      executing the plurality of different query interpretations to obtain resulting document sets, wherein, for each different query interpretation of the plurality of different executable query interpretations, the executing executes the query interpretation to obtain a resulting document set, from the whole document set, corresponding to that query interpretation, and identifies facet values represented in the resulting document set; and
      building and presenting to a user a query refinement interface, the query refinement interface presenting the plurality of different query interpretations and properties of the resulting document sets, and additionally presenting, for each of the one or more facet values, and relative to each other, facet value representation of the facet value in each of the resulting document sets.

13. The computer system of claim 12, wherein the query refinement interface further presents a respective interactive interface element for individually selecting each of the different query interpretations to narrow a current document set, representing results to be conveyed to the user, to a refined document set comprising the resulting document set corresponding to a selected query interpretation.

14. The computer system of claim 13, wherein the query refinement interface further presents a respective interactive interface element for individually selecting each of the one or more facet values to narrow the current document set to a refined document set comprising the documents in which a selected facet value is represented.

15. The computer system of claim 12, wherein the method further comprises ranking the one or more facet values relative to each other according to at least one facet value ranking method, and wherein the query refinement interface presents the facet value representation of the facet value in each of the resulting document sets relative to each other facet value of the one or more facet values in ranked order of the one or more facet values.

16. The computer system of claim 12, wherein the executing further comprises determining, for each facet value of the one or more facet values and each resulting document set of the plurality of resulting document sets, a correlation score representing density of the facet value represented in the resulting document set relative to the facet value represented in the whole document set, and wherein the query refinement interface presents representations of each such determined correlation score relative to other determined correlation scores.

17. A computer program product comprising:
a computer readable storage medium readable by a processing circuit and storing instructions for execution by the processing circuit for performing a method comprising:
receiving a query for querying documents of a whole document set, the documents of the whole document set deviating by one or more facet values;
generating a plurality of different query interpretations from query text of the query;
executing the plurality of different query interpretations to obtain resulting document sets, wherein, for each different query interpretation of the plurality of different executable query interpretations, the executing executes the query interpretation to obtain a resulting document set, from the whole document set, corresponding to that query interpretation, and identifies facet values represented in the resulting document set; and
building and presenting to a user a query refinement interface, the query refinement interface presenting the plurality of different query interpretations and properties of the resulting document sets, and additionally presenting, for each of the one or more facet values, and relative to each other, facet value representation of the facet value in each of the resulting document sets.

18. The computer program product of claim 17, wherein the query refinement interface further presents (i) a respective interactive interface element for individually selecting each of the different query interpretations to narrow a current document set, representing results to be conveyed to the user, to a refined document set comprising the resulting document set corresponding to a selected query interpretation, and (ii) a respective interactive interface element for individually selecting each of the one or more facet values to narrow the current document set to a refined document set comprising the documents in which a selected facet value is represented.

19. The computer program product of claim 17, wherein the method further comprises ranking the one or more facet values relative to each other according to at least one facet value ranking method, and wherein the query refinement interface presents the facet value representation of the facet value in each of the resulting document sets relative to each other facet value of the one or more facet values in ranked order of the one or more facet values.

20. The computer program product of claim 17, wherein the executing further comprises determining, for each facet value of the one or more facet values and each resulting document set of the plurality of resulting document sets, a correlation score representing density of the facet value represented in the resulting document set relative to the facet value represented in the whole document set, and wherein the query refinement interface presents representations of each such determined correlation score relative to other determined correlation scores.

* * * * *